Feb. 2, 1971    R. L. GARRETT    3,559,373
SUPERSONIC FLOW SEPARATOR
Filed May 20, 1968    6 Sheets-Sheet 1
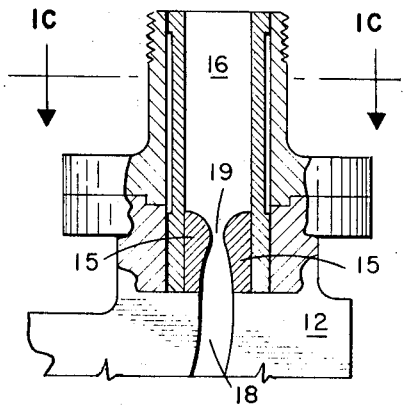
FIG. 1B
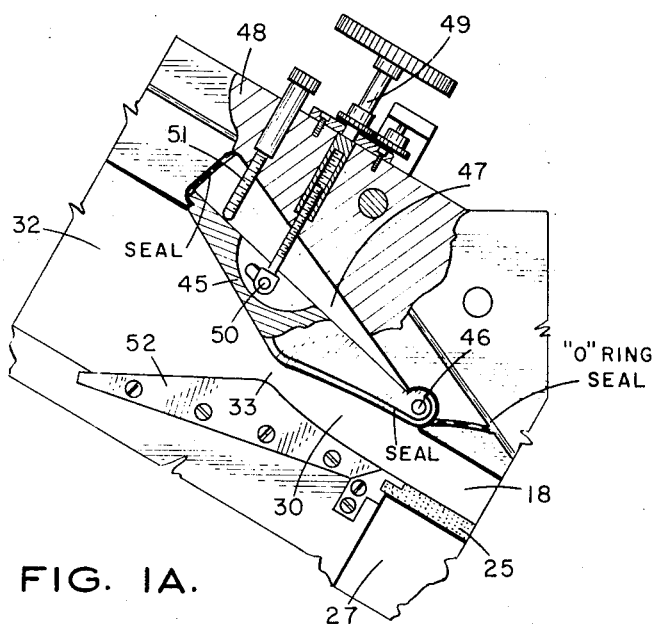
FIG. 1A.
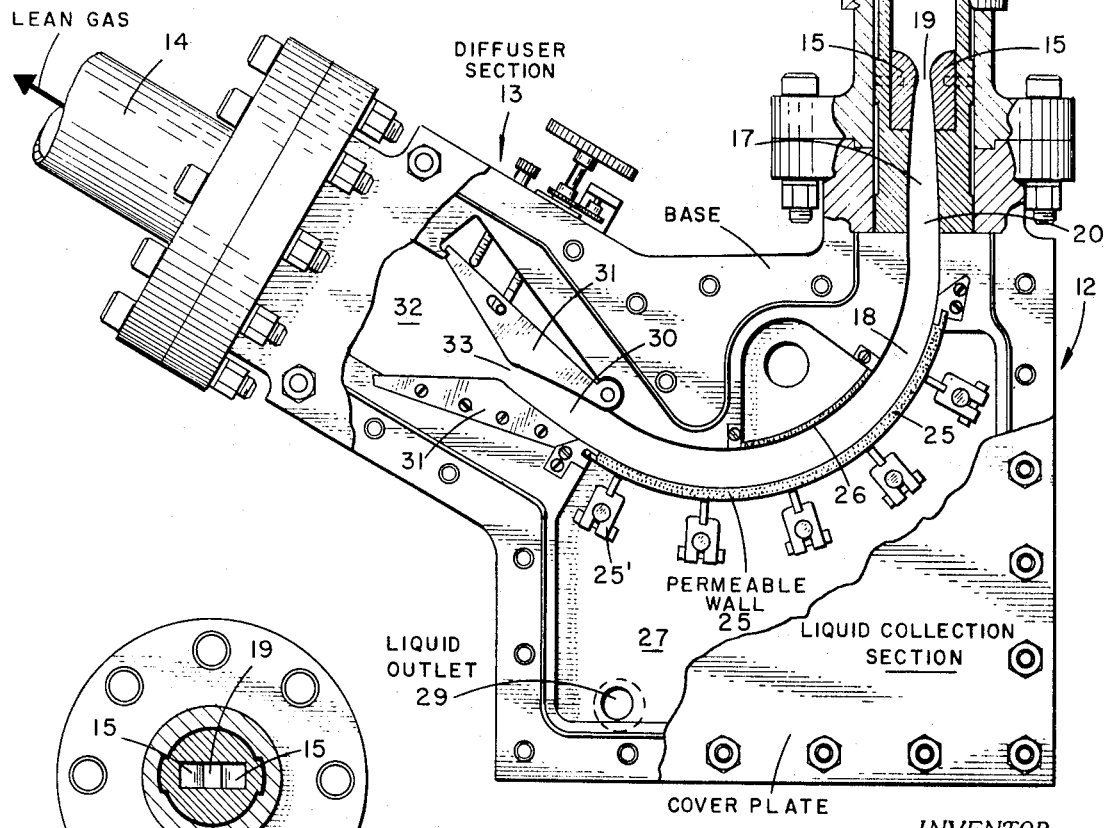
FIG. 1.
FIG. 1C.
INVENTOR.
ROBERT L. GARRETT,
BY John S. Schneider
ATTORNEY.

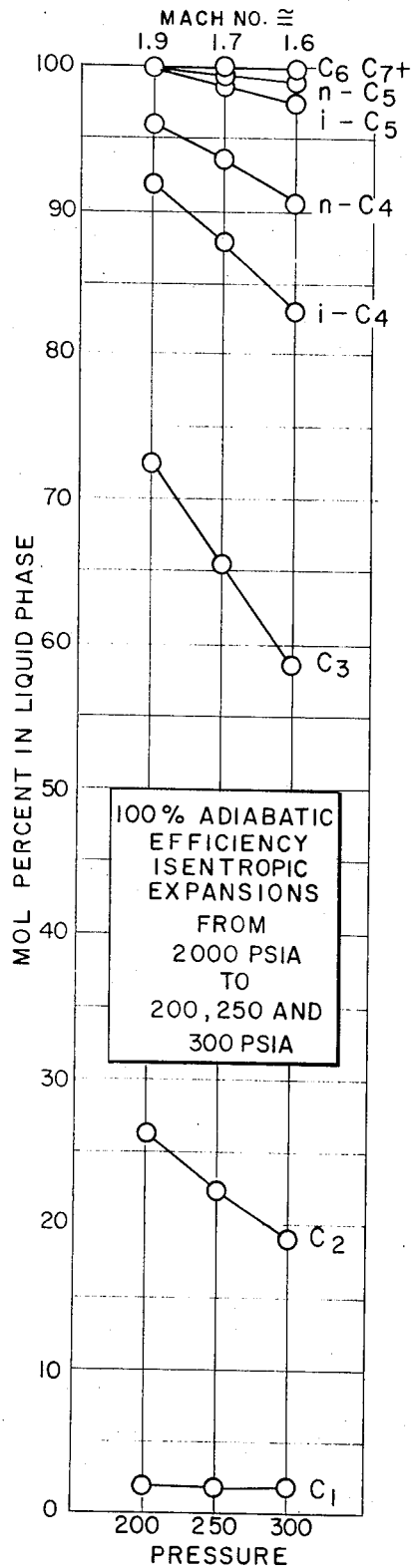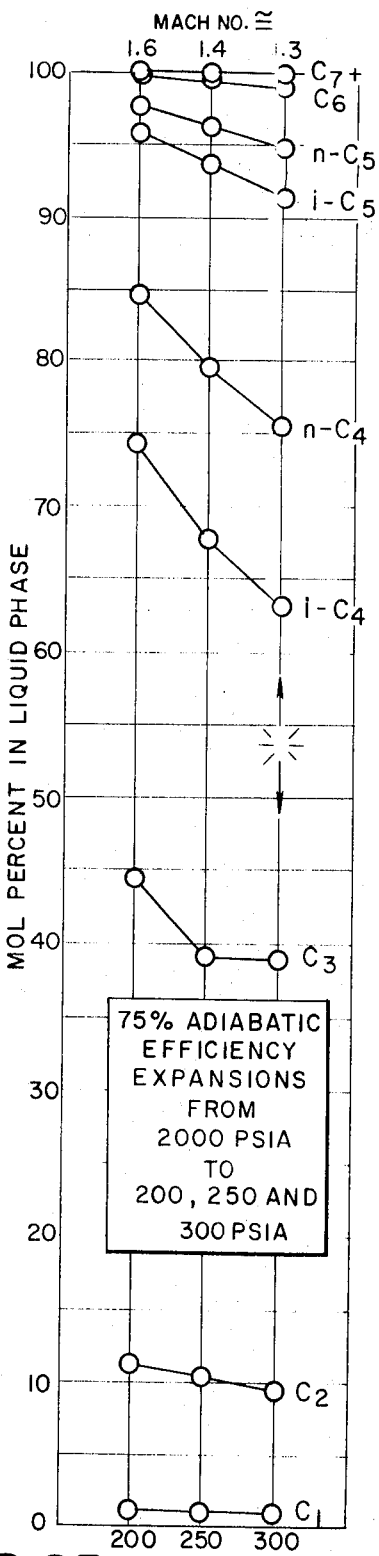
FIG. 2A.
FIG. 2B.

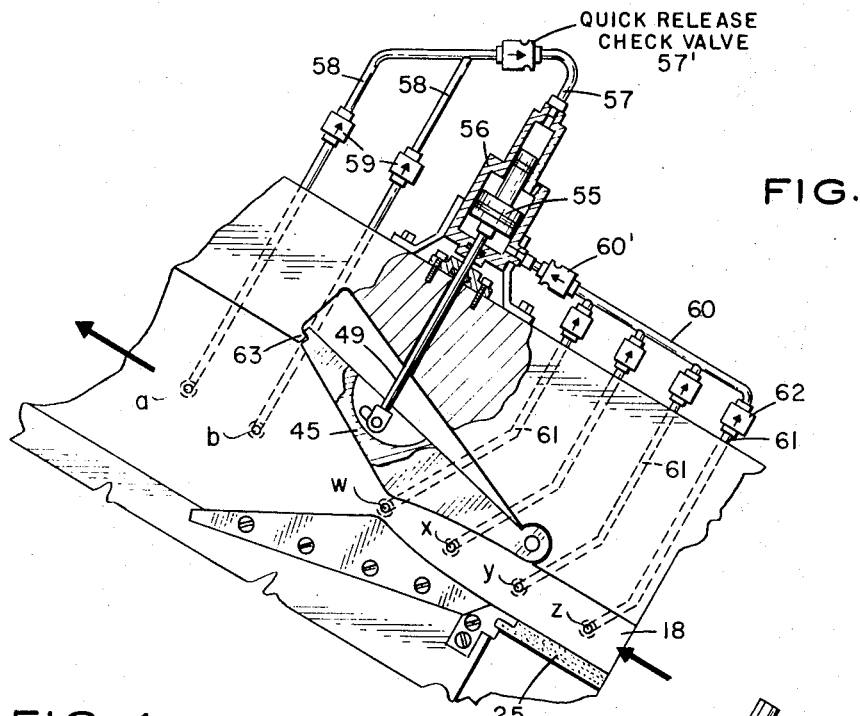
FIG. 3.
FIG. 4.
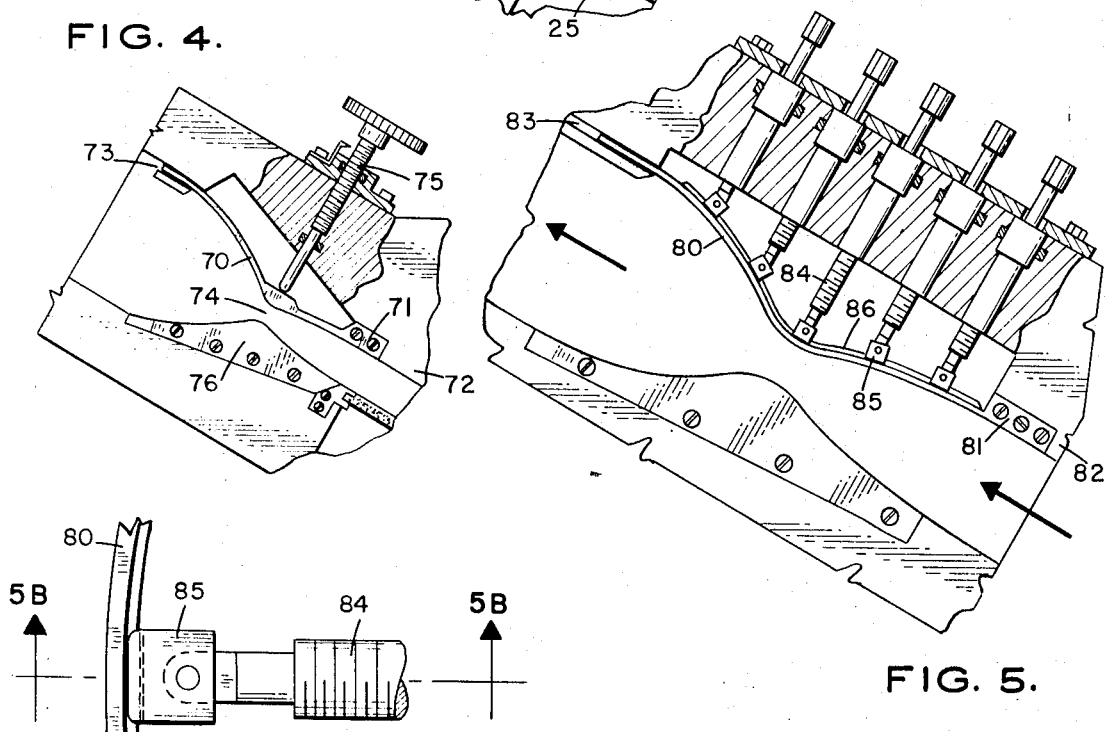
FIG. 5.
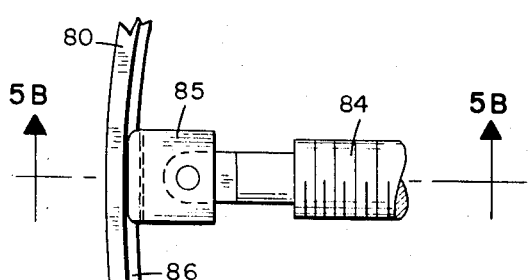
FIG. 5A.
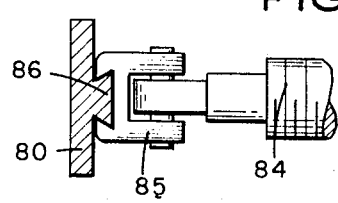
FIG. 5B.
INVENTOR.
ROBERT L. GARRETT,
BY John S. Schneider
ATTORNEY.

INVENTOR.
ROBERT L. GARRETT,
BY
ATTORNEY.

INVENTOR.
ROBERT L. GARRETT,
BY
ATTORNEY.

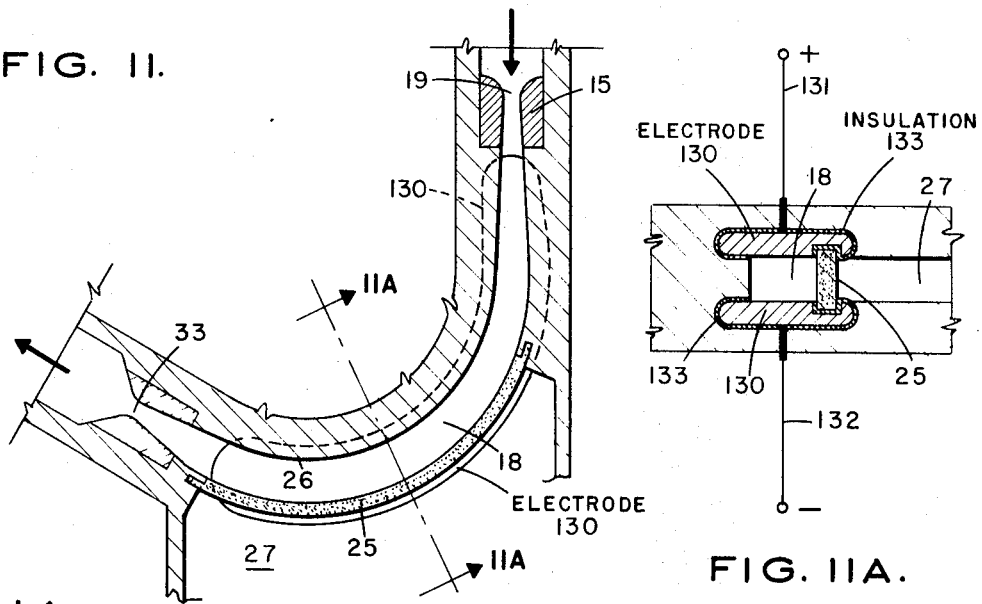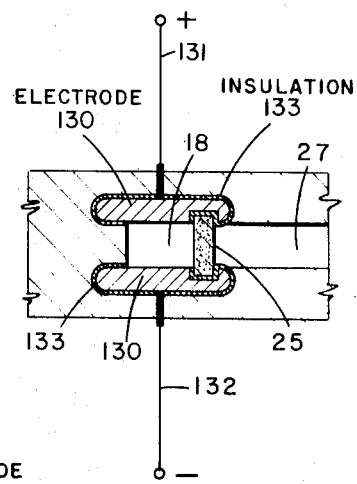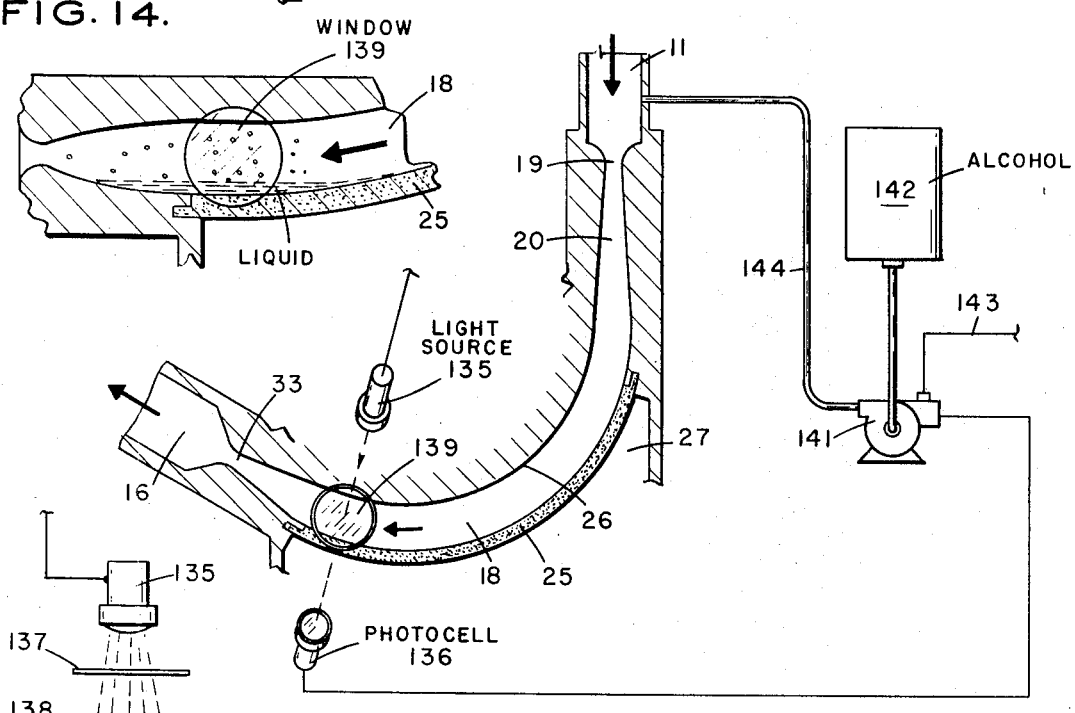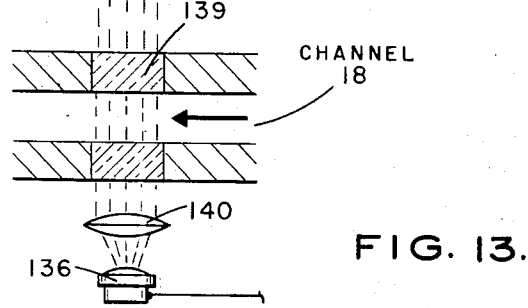

3,559,373
SUPERSONIC FLOW SEPARATOR
Robert L. Garrett, Houston, Tex., assignor to Esso Production Research Company, a corporation of Delaware
Filed May 20, 1968, Ser. No. 730,371
Int. Cl. B01d 53/00
U.S. Cl. 55—9                                    49 Claims

ABSTRACT OF THE DISCLOSURE

Method and apparatus for separating one or more components from a multicomponent, high-pressure gas stream The gas stream is expanded to supersonic velocity through a supersonic effuser to achieve low temperatures and low pressures in the supersonic gas stream and cause condensed liquid particles (drops) and/or solid particles to form. The supersonic gas stream is made to traverse a planar bend provided with a permeable outer wall to and through which liquid and/or solid particles are inertially moved and thereby separated from the gas stream. The separated particles are collected along with the dissolved and entrained gases which also separate from the gas stream. The supersonic gas stream is then decelerated to subsonic flow through a supersonic diffuser and part of the pressure of the gas stream is recovered. Means are provided to move the final shock wave to a stable position which is an optimum position for practical operation when a supersonic flow is started through the supersonic flow separator. To achieve such movement of the final shock wave, the throat area and contour of the diffuser is made adjustable so that the throat area and size of the diffuser channel are initially enlarged to move the final shock wave through the diffuser throat to start supersonic flow in the separator and thereafter reduced to locate the final shock wave near the diffuser throat to operate the separator efficiently at maximum back pressure.

Figure 6:
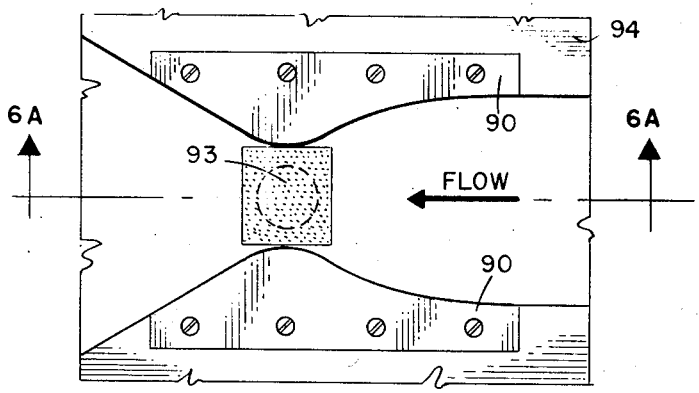

The present invention generally concerns supersonic separation of condensable components of a multicomponent, high-pressure gas stream. More particularly, the present invention concerns method and apparatus in which high efficiency expansion of a gas stream to supersonic velocities cools the gas stream to form a condensed phase. The condensed phase, as liquid and/or solid particles, is inertially moved to and through a permeable wall as the gas stream traverses a planar bend. A supersonic diffuser located at the end of the bend compresses and decelerates the gas stream to low subsonic velocities. Gas, either entrained or dissolved, in the condensed phase also separates from the gas stream along with the condensed phase and moves through the permeable wall. Supersonic expansion cooling and separation in this manner is particularly advantageous for use in separating components in natural gas processing.

The following terms used herein are defined in accordance with general aerodynamic usage:

"Supersonic effuser" means a flow channel having a convergent subsonic section upstream of a divergent supersonic section with an intervening sonic throat which functions as an aerodynamic expander.

"Supersonic diffuser" means a flow channel having a convergent supersonic section upstream of a divergent subsonic section with an intervening sonic throat which functions as an aerodynamic compressor.

"Throat" means a reduced area in a flow channel, as in an effuser or diffuser.

"Minimum running throat" means the minimum throat area in a diffuser where supersonic flow can occur in the throat.

"Contour" means shape of the wall or walls of flow channels, as in an effuser, diffuser or separator bend.

"Gaseous or gas stream" means a stream completely in the gas phase or one containing liquid and/or solid particles.

"Shock wave" means any discontinuity in supersonic flow across which flow properties abruptly change.

"Normal (90°) shock wave" is a wave across which gas velocity changes from supersonic to subsonic flow or vice-versa, as in a diffuser.

"Final shock wave" is a normal shock wave which occurs at or near the throat of a supersonic diffuser.

"Starting a supersonic flow" means achieving supersonic flow through the supersonic diffuser throat.

"Unstarting supersonic flow" means obtaining subsonic flow through the supersonic diffuser throat which occurs by reducing the diffuser throat area less than the minimum running throat area.

"Running a supersonic diffuser" means supersonic flow within a supersonic diffuser having a minimum running throat area.

"Boundary layer" means relatively slower moving gas which builds up along the flow channel walls.

Briefly, the present invention involves a method for separating condensable components from a multicomponent gas stream which includes the steps of expanding the gas stream through a supersonic effuser to achieve low temperatures and low pressures in the supersonic gas stream and to form thereby liquid and/or solid particles; separating particles from the gas stream by directing the gas stream to traverse a planar bend provided with a permeable wall to and through which particles are inertially moved; decelerating the gas stream to subsonic flow through a supersonic diffuser and recovering a portion of the pressure of the gas stream; and adjusting the position of the final shock wave to locate the final shock wave near the diffuser throat for efficient operation at maximum back pressure.

The present invention also includes apparatus for conducting the above-described method which includes an adjustable diffuser means for varying the position of the final shock wave comprising at least one movable wall having either a fixed configuration, pivotally mounted on one end thereof, or a flexible configuration. The wall or walls may be adjusted automatically in response to pressure changes in the flow stream adjacent the diffuser throat.

A vent or bypass system to withdraw gas may be employed to obtain "starting" of supersonic flow. Also, a mass reservoir system (surge chamber) may be used to stabilize the position of the final shock wave.

Obstacle(s), such as notches or a roughened surface, may be provided to generate weak shock waves in the bend in order to enhance ejection of particles from the gas stream. In addition, an electrostatic field applied across the bend enhances particle ejection and obtains more rapid droplet coalescence and improved droplet recovery from the supersonic flow separator. The permeable outer wall of the bend is preferably constructed of thin, low permeability material in order to obtain good particle recovery and gas rejection. Also, permeable areas may be strategically located on the inner wall of the bend to remove boundary layer which improves efficiency of the flow stream by preventing unwanted shock waves and reducing friction and by maintaining a smaller size channel to facilitate particle ejection. Further, means may be provided for detecting abnormal operation of the flow separator in order to control automatically changes in operating parameters.

The broad primary object of the present invention, therefore, is to provide improved method and apparatus in the supersonic separation of components flowing in a gas stream.

The above object and other objects and advantages of the present invention will be apparent from the following description when taken with the drawings wherein:

FIG. 1 illustrates one embodiment of the supersonic expander separator of the invention;

FIG. 1A is an enlarged view of the diffuser section of the embodiment shown in FIG. 1;

FIG. 1B illustrates a modification of the effuser section of the embodiment shown in FIG. 1;

FIG. 1C is a view taken on lines 1C—1C of FIG. 1B;

FIGS. 2A and 2B illustrate extent of condensation of natural gas components for two different expansion efficiencies;

FIG. 3 illustrates the supersonic expander separator of FIG. 1 provided with pressure control means for controlling the size of the area of the diffuser throat and/or contour of the diffuser;

FIG. 4 illustrates a flexible shape adjustable diffuser;

FIG. 5 illustrates another type flexible shape adjustable diffuser;

FIG. 5A is a detailed fragmentary view of a portion of FIG. 5;

FIG. 5B is a view taken along lines 5B—5B of FIG. 5A;

FIG. 6 shows a diffuser section provided with different means for "starting" supersonic flow;

FIG. 6A is another view of the diffuser section of FIG. 6;

FIG. 7 shows a diffuser section provided with means for stabilizing supersonic flow;

FIG. 7A is a view taken along lines 7A—7A of FIG. 7;

FIG. 8 shows the separator bend portion of a supersonic expander separator to illustrate another embodiment of the invention;

FIG. 9 shows the separator bend portion of a supersonic expander separator to illustrate still another embodiment of the invention;

FIG. 9A is a view taken along lines 9A—9A of FIG. 9;

FIG. 10 illustrates still another embodiment of the supersonic expander separator;

FIG. 10A is an enlarged view of the separator portion of the supersonic expander separator illustrated in FIG. 10;

FIG. 11 illustrates another embodiment of the supersonic expander separator;

FIG. 11A is a view taken along lines 11A—11A of FIG. 11;

FIG. 12 illustrates the supersonic expander separator of FIG. 1 provided with parameter control means;

FIG. 13 is a top view of the control mechanism of FIG. 12; and

FIG. 14 is another view of the control mechanism of FIG. 12.

As shown in FIG. 1, the components of the supersonic expansion separator illustrated in that figure are an effuser section 10 connected at its subsonic end to a source of high-pressure gas in inlet conduit 11 and at its supersonic end to a separation section 12. The supersonic end of a diffuser section 13 is connected to the downstream end of separation section 12. The subsonic end of diffuser section 13 is connected to a gas stream discharge conduit 14.

Effuser section 10 includes a replaceable effuser 15 having a convergent subsonic section 16 connected to inlet pipe 11 and a divergent supersonic section 17 connected to a flow channel 18 of separation section 12. The effuser has an intervening sonic throat 19. The function of the effuser is to expand gas flowing therethrough essentially isentropic. The design of effusers of this type is well known to the art and may be according to principles described in DRL Publication No. 406 of the Defense Research Laboratories, University of Texas (1957), or the pamphlet by Kuno Foelsch, No. NA–46–235–2, published by North American Aircraft Corporation, May 1946. Other references which describe effuser design methods for rectangular cross-section configurations are "An Accurate and Rapid Method for the Design of Supersonic Nozzles," Beckworth, J. E., and Moore, J. A., NACA Space TN 3322, February 1955; "Nozzles for Supersonic Flow Without Shock Fronts," Shapiro, A. H., Journal of Applied Mechanics, Transactions ASME, vol. 66, p. A–93 (1944); "Supersonic Wind Tunnels—Theory, Design and Performance," J. Ruptash, UTIA Review No. 5, U. of Toronto, I vol. of Aerophysics, June 1952; and "Nozzle Design," Puckett, A. E., Journal of Applied Mechanics, December 1946, p. 265. A reference describing diffuser design methods for circular cross-section configurations is "The Analytical Design of an Axially Symmetric Laval Nozzle for a Parallel and Uniform Jet," Foelsch, J., Journal of Aeronautical Sciences, March 1949, p. 161ff.

In gas streams expanded by such supersonic effusers, the temperature achieved can be low, dependent upon the amount of condensation occurring. Such temperatures can be predicted for simple flow systems using information given in The Dynamics and Thermodynamics of Compressible Fluid Flow, vols. 1 and 2, by Ascher H. Shapiro, The Ronald Press Company, New York.

In FIG. 1 the supersonic section 17 of effuser 15 includes a generally divergent straight flow path 20 of rectangular cross-section. This intermediate section is used to provide time for natural forces in supersonic flow to cause droplet coalescence in certain applications of the supersonic expander; however, it is not a necessary feature in all applications thereof. FIG. 1B shows effuser 15 without such an intermediate section. As shown in FIG. 1C, the throat 19 of effuser 15 is of rectangular cross-section. Flow path or channel 20 is made divergent in order to maintain the gas stream at high velocity. The design of divergent channels of this type may be found in a number of publications. In the Journal of Applied Physics, June 1946, an article by J. H. Keenan and E. P. Newmann, entitled, "Measurement of Friction in a Pipe for Subsonic and Supersonic Flow of Air," experimental data to substantiate theory on friction losses is presented. An article by R. E. Wilson, entitled, "Turbulent Boundary Layer Characteristics at Supersonic Speeds—Theory and Experiment," Journal of Aeronautical Sciences, vol. 17, p. 585, presents a complete description of channel compensation.

Flow path or channel 18 is curved and is preferably of rectangular cross-section. It is formed of opposing side walls, an outer curved permeable wall 25 and an inner coplanar curved wall 26. Wall 25 may be formed of permeable metal. Channel 18 is curved in design in accordance with principles set forth in an article by L. Liccini, entitled, "Analytical and Experimental Investigation of 90° Supersonic Turbine Passages Suitable for Supersonic Compressors and Turbines," National Advisory Committee for Aeronautics, RLM 9G07 (1949), or as in an article by E. Boxer et al., entitled ,"Application of Supersonic Vortex Flow Theory to the Design of Supersonic Impulse Compressors or Turbine Blade Sections," National Advisory Committee for Aeronautics, RLM 52B06 (1952). Channel 18 is also diverged in accordance with the equations and tables in the aforementioned article by R. E. Wilson. General information on this article, including circularly and rectangularly configured channels may be found in texts, such as vols. 1 and 2 of the aforementioned Shapiro reference and for rectangular configurations alone, the aforementioned bulletin by J. Ruptash.

Permeable wall 25 is held in place by means of wall supports 25'. Liquid droplets which separate from the gas stream and pass through permeable wall 25 flow into a collection chamber 27.

Conduit 29 is connected to chamber 27 for the purpose of discharging gas and liquid collected in chamber 27. The downstream end of channel 18 at the end of the bend or curve connects to the convergent supersonic section 30 of diffuser 31 which also includes a divergent subsonic section 32 which connects to discharge conduit 14 and has an intervening throat 33. The contour of diffuser 31 and the area of throat 33 are made adjustable. The gas stream discharges through conduit 14 to other components of the system not shown. The final shock wave in the supersonic separator is a normal (90°) shock wave which accompanies the transition from supersonic to subsonic velocity. If this shock wave is minimum strength, which requires that it be located exactly at the throat of the supersonic diffuser, maximum efficiency in operation of the supersonic expansion separator is achieved. For practical purposes to prevent "unstarting," the final shock wave should stand slightly downstream from the diffuser throat 33; however, the closer it is to the throat, the higher is the pressure recovery efficiency. The final shock wave position is vulnerable to change to an "unstarted" position by small compressional pulses originating downstream from it. "Unstarted" flow means that flow is subsonic through the diffuser and perhaps upstream in channel 18. The "unstarted" shock could stand anywhere in channel 18 upstream of diffuser throat 33, depending on specific channel geometry and conditions. To "start" supersonic flow after it has become "unstarted" requires essentially the same operation as for the initial "start," namely, opening the diffuser throat. Restarting, in practical operation, is best done automatically or semi-automatically upon sensing mechanically the "unstarted" condition, such as by pressure change.

The diffuser is made adjustable so that the throat area 33 of the diffuser can be altered. The throat area must be enlarged to "start" supersonic flow and then reduced to the minimum running area for highest pressure recovery efficiency. Closing the throat too much will "unstart" the flow. Assuming an ideal gas and single phase flow, operating parameters, such as diffuser throat area ratios for starting and running, can be determined from information available in the text, Supersonic Inlet Diffusers and Introduction to Internal Aerodynamics, by Dr. Rudolf Hermann, published by Minneapolis-Honeywell Regulator Company, Minneapolis, Minn., and Minneapolis-Honeywell Regulator Company, Ltd., Toronto, Canada, second edition. For practical operation the adjustable diffuser block must have freedom to move yet maintain proper sealing to prevent gas by-passing the diffuser contour. Such leakage of gas would interfere with the desired flow pattern of the diffuser. As an example, the pivoted block type adjustment diffuser can be properly sealed by an O-ring at its contour edge and a snug fitting contact at its trailing edge as illustrated in FIG. 1A. Similarly, O-rings or gaskets could be used to seal other adjustable diffuser plate designs.

In gas streams expanded by the supersonic effusers, the temperature achieved can be low dependent upon the amount of condensation occurring. Temperatures can be predicted for simple flow systems using information provided in the Shapiro, vols. 1 and 2 reference cited above.

Complex multicomponent systems, such as natural gas when cooled by expansion form liquid. A typical natural gas composition is given in the following Table I.

TABLE I.—COMPOSITION OF A TYPICAL NATURAL GAS

| Component: | Composition (mol percent) |
|---|---|
| $C_1H_4$ | 92.390 |
| $C_2H_6$ | 3.472 |
| $C_3H_8$ | 1.437 |
| $iC_4H_{10}$ | 0.370 |
| $nC_4H_{10}$ | 0.451 |
| $iC_5H_{12}$ | 0.167 |
| $nC_5H_{12}$ | 0.160 |
| $C_6H_{14}$ | 0.667 |
| $C_7H_{16}$ plus | 0.887 |
| Total | 100.000 |

Temperatures and Mach numbers achieved when processing gas in the supersonic expander separator depend on the extent of pressure reduction as indicated in the following Table II:

TABLE II.— EXPANSION OF 2,000 P.S.I., 100° F. NATURAL GAS (COMPOSITION IN TABLE I) TO VARIOUS PRESSURES AND TEMPERATURES, ASSUMING 100% ADIABATIC EFFICIENCY (ISENTROPIC)

| Pressure after expansion (p.s.i.a.) | Mach Number of stream (approx.) | Temperature of stream (approx.) (° F.) |
|---|---|---|
| 750 | 1.15 | −2 |
| 500 | 1.35 | −36 |
| 300 | 1.62 | −75 |
| 250 | 1.69 | −87 |
| 200 | 1.86 | −100 |

The extent of condensation of each component can also be predicted by known phase behavior relationships and equations of state and such values are shown in FIGS. 2A and 2B for the typical natural gas compositions given in Table I.

In FIGS. 1 and 1A, one type of fixed shape adjustable diffuser is illustrated. An adjustable plate or block member 45 properly contoured to the desired shape is hinged at one end 46 for pivotal inward and outward movement in a recess 47 formed in housing 48 of diffuser section 13. A shaft 49 is connected pivotally to adjustable plate 45 at 50. Shaft 50 may be hand-operated or operated semi-automatically, such as in a mechanical-hydraulic connection. Another stabilizer shaft 51 abuts the inner surface of adjustable plate 45 to stabilize or maintain adjustable plate 45 in the position established by shaft 49. The opposing adjustable plate or block 52, shown as fixed in FIG. 1A, may, if desired, be made adjustable in the same manner that plate 45 is made adjustable.

Adjustable plate 45 may be automatically controlled by a servo-mechanism which responds to pressure changes upstream and downstream of throat 33 of diffuser 31. Such an arrangement is illustrated in FIG. 3. Shaft 49 is pivotally connected to adjustable plate 45 as illustrated in FIG. 1A. The other end of shaft 49 is connected to a force multiplier piston 55 and cylinder 56 (dual action). A conduit 57 having a quick release check valve 57' is connected between one end of cylinder 56 and branch conduits 58 leading to back pressure taps $a$ and $b$ downstream of throat 33. Each branch conduit 58 contains a check valve 59. A conduit 60 having a quick release check valve 60' is connected between the other end of cylinder 56 and branch conduits 61 leading to diffuser pressure taps $w$, $x$, $y$ and $z$. Each branch conduit 61 contains a check valve 62. When pressure at tap $a$ or $b$, for example, is abnormally low because of improper diffuser function and pressure at either or all taps $w$, $x$, $y$ or $z$ in diffuser 13 becomes abnormally high, the force on the large end of piston 55 moves shaft 49 outwardly and opens plate 45 to restart supersonic flow by opening the diffuser throat 33. Pressure at tap $b$ then rises and at taps $w$, $x$, $y$, $z$ pressure falls allowing piston 55 to move shaft 49 inwardly and shut plate 45 against the stopping lip 63, at which position normal pressure recovery operation occurs within the diffuser. Such automatic operation could also be achieved using a hydraulic pump and cylinder with a suitable electro-pneumatic control system.

Another type of diffuser section is illustrated in FIG. 4. A plate 70 composed of flexible material, such as spring steel, is fixed at one end 71 to a housing 72 and at the other end is fitted into a slot 73 formed in housing 72. A shaft 75 abuts plate 70 adjacent throat 74 to urge plate 70 inwardly to close throat 74 when desired. Throat 74 opens upon release of the force applied to plate 70 by shaft 75. Shaft 75, as in the case of shaft 49, may be manually, semiautomatically or automatically controlled. Also, if desired, the opposing fixed plate 76 of the diffuser illustrated in FIG. 4 could be made adjustable in the same manner.

An arrangement similar to that described with regard to FIG. 4 is shown in FIGS. 5, 5A and 5B. A flexible plate or leaf spring 80 is fixed at one end 81 to housing 82 and at the other end is fitted into a slot 83 formed in housing 82. A plurality of shafts 84 engage the inner surface of leaf spring 70. A swivel member 85 is arranged on the tip of each shaft 84 and is keyed to a track 86 on the inner surface of leaf spring 80. The contour of spring 80 is changed to that desired by manipulation of each shaft 84 which also may be operated manually, semiautomatically or automatically.

Another similar type diffuser having a flexible deformable plate or leaf spring may employ a plurality of abutting contour members positioned between the leaf spring and a form block with the inner surface of the form block configured in the contour of the shape it is desired that the leaf spring assume.

Figure 6A:
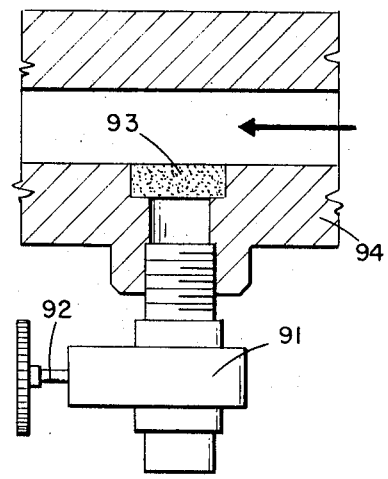

For certain practical purposes, a fixed diffuser geometry of minimum-running throat area is preferred. Rather than move the side walls (plates or blocks) of the diffuser to open the throat, a vent or bypass system to withdraw gas from the flow stream in the throat may be provided, as shown in FIGS. 6 and 6A. Such a system passes the required quantity of the flow stream past the throat to move the shock wave through the throat. Bypassing of the flow stream gas around the throat is very brief, after which the flow is started. Referring to FIGS. 6 and 6A, apparatus for bypassing flow stream gas for the purpose of "starting" flow is shown. A fixed diffuser plate or block 90 is connected to the diffuser housing and a discharge valve 91 operated by shaft 92 closes and opens a permeable but smooth area 93 in the side wall 94 of the diffuser housing. Valve 91 may be operated in any desired manner—manually, semiautomatically or automatically.

Figure 7:
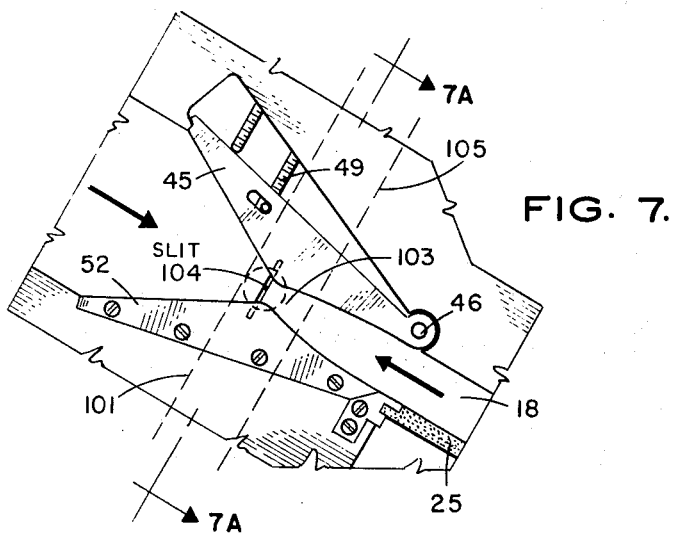
Figure 7A:
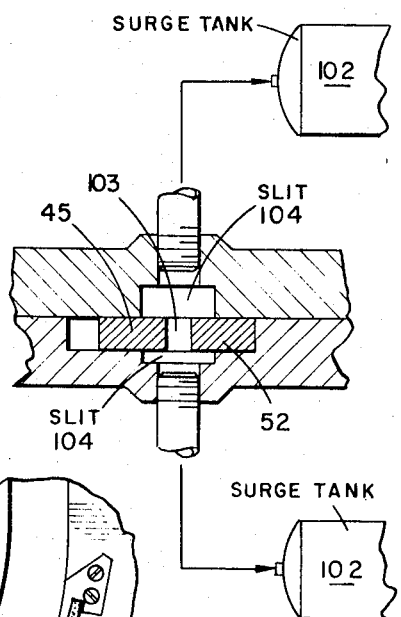

To aid in stabilization of the position of the normal shock so that it will not move to an unstable position, the mass reservoir system (surge chambers) illustrated in FIGS. 7 and 7A may be employed. Except for the addition of the surge chamber system 100, the diffuser section is the same as that shown and described with respect to FIGS. 1 and 1A. The function of the surge chamber system is to control the shock wave position when larger than average pressure pulses occur in the downstream conduit fed by the supersonic expansion separator. When the diffuser is operating properly with the shock standing near the throat, as indicated by dotted line 101 in FIG. 7, velocity in the throat is supersonic and the pressure is low. The surge chambers 102 which are connected to the throat 103 through slits 104 contain gas at low pressure. If the compression pulse moves the shock upstream of the slits 104, the gas stream pressure at the slits rises and a portion of the flow stream is removed into chambers 102. Velocity of the upstream movement of the shock is reduced and can be stopped before it reaches the unstable position indicated by dotted line 105 from which point the shock goes farther upstream and upstarts the flow. When the disturbing compressional pulse dies out, the shock wave moves to its preferred position downstream of the throat (dotted line 101) and surge reservoirs or chambers 102 will empty to their initial low-pressure condition. The size of surge chambers 102 is a function of particular flow conditions. The design thereof may be found in Kantrowitz, A., and Neice, S. E., "Stabilization of Shock Waves in Channel Flow," Journal of Aeronautical Sciences, May 1950.

Figure 8:
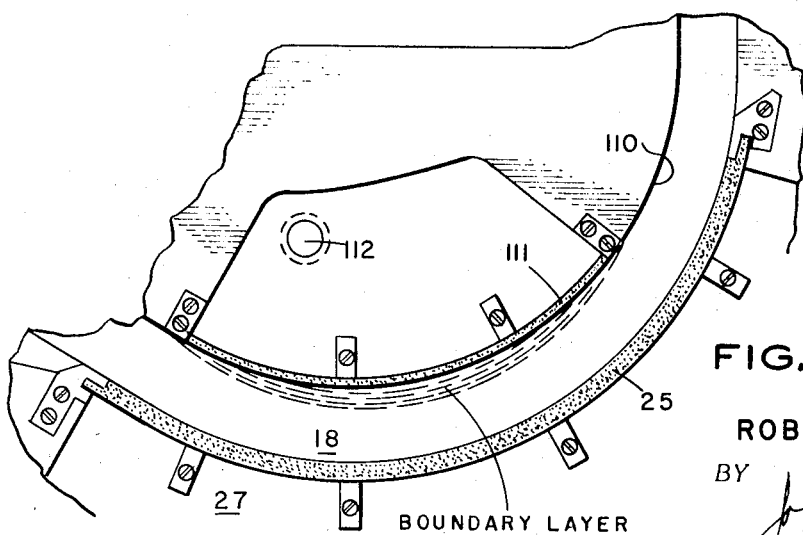

Channels designed for flowing gas streams at supersonic speeds are generally diverged to accommodate for the buildup (with length) of a stagnant gas boundary layer along the walls. Removal of part of this gas layer is often desirable because of two factors: (1) The boundary layer closes to fill an appreciable part of the flow channel and reduces flow efficiency; and (2) Boundary layer separation occurs in some cases and is the source of disturbance which causes shock waves. Channel divergence and boundary layer removal (suction) are both useful either separately or together in improving the expansion efficiency of the supersonic flow process. FIG. 8 illustrates one technique for removing boundary layer. As shown in this figure, the inner wall 110 is provided with a permeable area 111 which communicates with a chamber to which is connected a suction outlet 112. Suction applied to the boundary layer through the permeable area is helpful to remove the boundary layer on the inner curvature of the bend to keep the boundary layer thin and prevent separation because of the unfavorable pressure gradient naturally present on this type of convex curvature. The permeable outer curvature wall 25 serves to keep the boundary layer attached to the wall. The permeable area 111 is strategically located on the walls of the supersonic channel where otherwise adverse boundary layer behavior would result. Such locations are generally on the inner curvature and convergent supersonic channels. Diffusers can be made to operate more efficiently by removal of the boundary layer in or near the diffuser. Removal of the boundary layer through these permeable areas prevents subsonic choking and generally improves the efficiency of the flow stream by preventing shock waves and by reducing friction and minimizing channel size.

Figures 9, 9A:
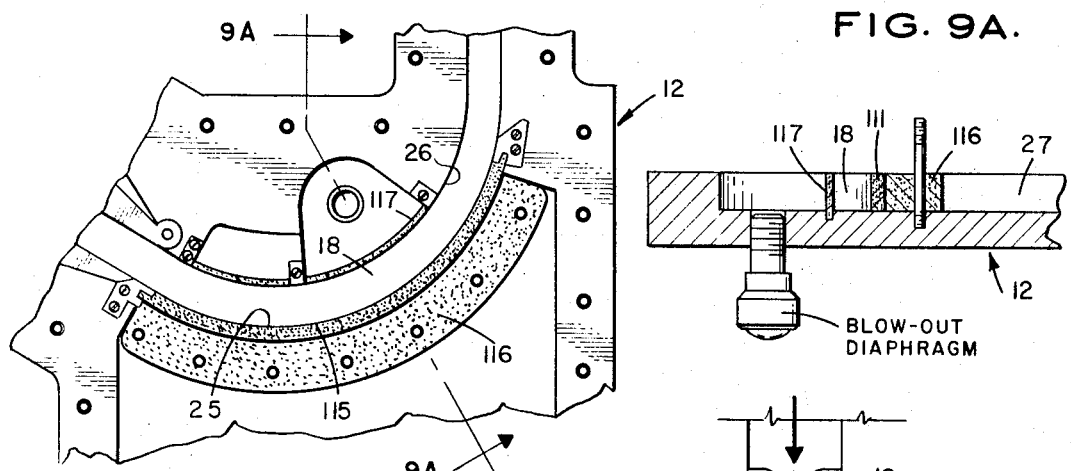

FIGS. 9 and 9A illustrate in greater detail the structural components of the liquid separation section 12. As seen in these figures, channel 18 is curved. The outer bend wall 25 is preferably composed of a thin, e.g., 1/8" thick, porous stainless steel wall 115 backed by a supporting wall 116 sufficiently permeable so as not to limit the liquid and gas which comes through permeable wall 115. Wall 116 is secured to the separator housing by bolts and provides good uniform support to prevent distortion and destruction of wall 115 by the gas flow over, and the differential pressure through that wall. Wall 115 has the following fundamental properties: (1) proper permeability to pass the required amount of liquid with the pressure drop available; (2) limited permeability to prevent an excessive amount of gas from passing through the wall; (3) a smooth surface adjacent to the supersonic flow to prevent shocks; (4) sufficient compressive and yield strengths (but members may be used to support the wall as described above); and (5) abrasion resistant. Wall materials are chosen dependent upon complex relationships between parameters which control liquid and gas saturation levels. Such parameters are thickness, permeability, relative permeability, pore sizes, pore size distribution, pore channel geometry and wettability. Operating conditions necessarily affect the choice of wall material. Such conditions relate to the pressure differentials across the wall and flow rates. One suitable type of permeable material is made of thin, low permeability, sintered stainless steel which provides good liquid recovery and gas rejection and durability. A portion 117 of the inner wall 26 of the bend is made of a frangible material to act as a burst or blowout wall. Behind wall portion 117 a conventional safety blowout valve or diaphragm can be provided in the event pressure of the fluid flowing in channel 18 becomes excessive.

Figure 10:
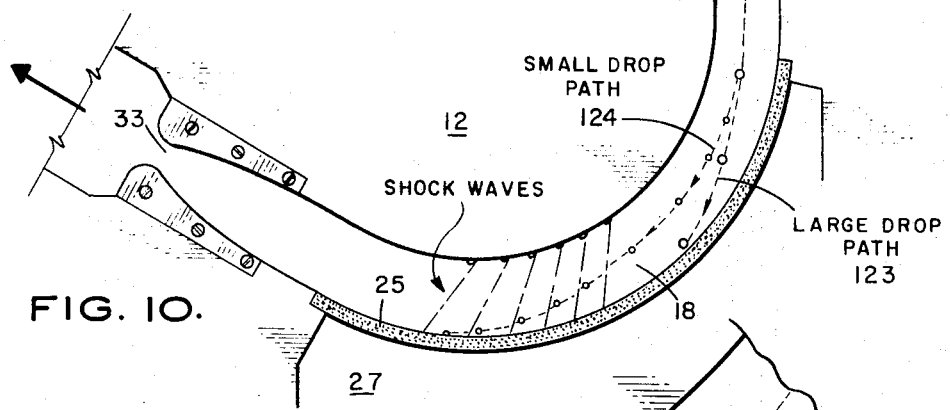
Figure 10A:
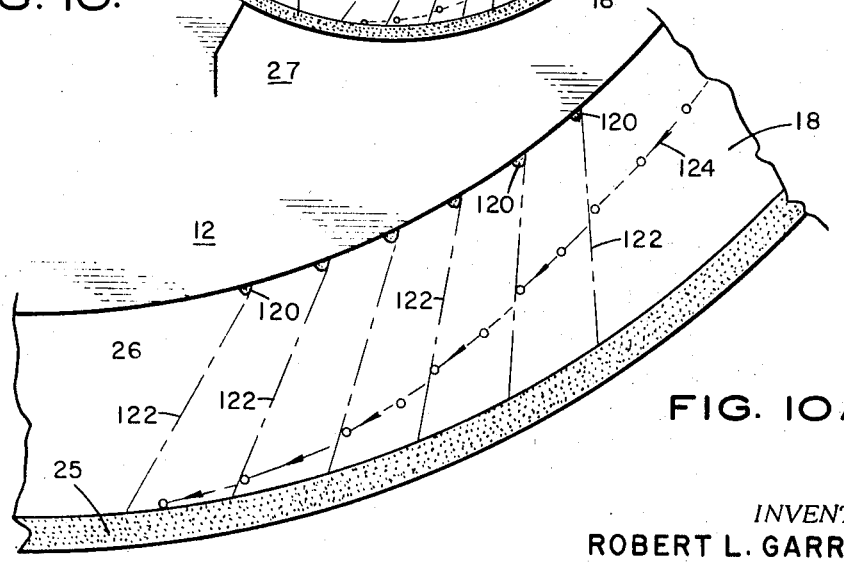

In order to improve ejection of the smaller liquid droplets to the outer curvature of the supersonic bend (whether planar or otherwise) a series of weak shock waves are intentionally created in a portion of the bend. FIGS. 10 and 10A illustrate one manner in which such shock waves are generated. A series of very small spaced-apart notches or ridges 120 are formed on the inner curvature or wall 26 of the liquid separation section 12. The set of shock waves of low strength indicated by lines 122 extend from the set of notches to the outer permeable wall 25 of the bend. As indicated by dotted line 123, large droplets are by centrifugation ejected to the outer wall before small ones indicated by dotted line 124. To improve recovery of the small droplets, the shock wave system is introduced. As shown in FIGS. 10 and 10A, across each shock wave there is a density discontinuity which acts as a permeable "membrane" to bounce the small droplets radially outwardly. Each successive discrete density change moves the small droplets toward the outer permeable wall 25.

While only six (enlarged) notches are shown for purposes of illustration, numerous notches would be provided in practice, such as roughening the surface in a particular way. In some cases a set of lines scribed into the inner wall surface would be desirable. The shock wave bounce technique is more advantageously applicable in a curved channel and particularly applicable in a channel whereby boundary layer removal shock wave reflection is minimized. This is so because where boundary layer is present, an intersecting shock wave can disturb the boundary layer causing it to separate from the wall which can generate an opposite running wave detrimental to outward movement of the drops.

The combination of an electric field and a curved separation flow channel to enhance the coagulation rate of the droplets in the gas stream is illustrated in FIGS. 11 and 11A. At least one set of positive-negative electrodes 130 is positioned across the constant dimension of rectangular channel 18. Droplet coagulation in an electric field of uniform high intensity by induced dipolar attraction requires that some droplets be closer to other droplets than the average separation distance and that a size distribution exist. This occurs to a certain extent in any natural system of droplets because of the random location of droplets, but it is very desirable to bring about droplet motion in some way to hasten the drop growth process induced by the electric field. In the curved supersonic channel, large droplets will move toward the outer permeable wall 25 faster than small droplets and, consequently, these sized droplets move relative to each other. As one droplet approaches another droplet, attractive dipolar force becomes very large rapidly and coalescence of two drops into one larger droplet occurs when the droplets touch. Droplet losses due to shattering and scattering of fragments of big droplets impacting on the bend outer wall are also reduced by application of an electric field in the immediate area of the impact. A large number of small droplets (fragments) form when a large droplet breaks apart on impact. The small droplets can be easily lost back into the supersonic gas flow stream and are not likely recoverable again since they are so small and have so little inertia. By applying an electric field through leads 131 and 132 to electrodes 130 suitably insulated by insulation 133 in the vicinity of impact and shatter on wall 25, fragments will be united or pulled back into a single large droplet, thereby preventing their individual loss. Generally, higher voltages, preferably constant polarity on the electrodes, gives better benefit to droplet coalescence. The upper limitation on voltage is the maximum possible without arc discharging across the stream or rupturing of drops by dipolar forces.

In FIGS. 12, 13 and 14, a simple technique is illustrated for approximating droplet size and number of droplets and thus estimating with good accuracy the quantity or relative quantity of liquid (and/or) solid in the flow stream without disturbing the flow. That technique involves measuring the attenuation of light passing through the flow stream. This well-known method of scattering of light by particles is used to control operational parameters in the supersonic expansion separator. In FIG. 12, monitoring of a natural gas flow stream for residual liquid content is illustrated. If a suitable window is provided in the channel, monitoring can be at any chosen location. In this application for illustration of utility, the monitoring is at the end of the separator bend. At this point, most of the liquid separated from the flow stream in normal operation would have been ejected and removed through permeable wall 25. Higher than the normal residual droplet concentration would indicate some malfunction in the separator system and would signal a change in operation. The change could be made automatically or semiautomatically utilizing an electrical signal from a photo cell to actuate the change through a servo-unit.

For more accurate evaluation of liquid content, attenuation of several monochromatic light beams at a given location would be measured. A set of filters could serve to give various light wave length ranges, or a monochromator instrument could be used.

A source of (preferably monochromatic) light 135 is positioned on one side of the flow channel just upstream of diffuser section 13 and a photocell 136 is arranged on the opposite side of the channel to detect a drop in light intensity and to signal the malfunction. As seen more clearly in FIG. 13, light source 135 is passed through a filter 137, a collimating lens 138, window 139 in the wall of channel 18, the gas stream, a window in the opposite wall of channel 18 and a focusing lens 140 to photocell 136.

As illustrated in FIG. 14, the unrecovered liquid attenuates the 180° light beam by scattering away the light in the 180° beam. As an example of the operation of this equipment, assume that hydrate formation in a cold natural gas stream is being either completely or partially inhibited by carefully regulated alcohol antifreeze injection into the inlet stream. A mulfunction, hydrate plugging of the permeable bend wall 25, would cause excess unrecovered liquid to pass through the light beam. An alcohol injection pump 141 connected to an alcohol tank or source of alcohol 142 and suitably powered as indicated at 143, injects alcohol through a conduit 144 into gas inlet conduit 11. The pump rate is controlled by a control signal from the photocell to regulate the rate of alcohol injection. Excessive addition of alcohol is generally undesirable from a cost standpoint and other reasons. For unattended operation where the inlet temperature of the gas stream and its water content may fluctuate rather widely over short periods the rate of alcohol injection is critical to performance. If too little alcohol is added, the permeable wall 25 will plug and liquid recovery through that wall will decrease. More liquid will pass through the exit of the bend and will be detected by the photocell 136 which, in turn, will signal pump 141 and increase alcohol injection through conduit 144. Continual monitoring of the liquid content by the light beam will permit continual incremental adjustments of the rate to optimize the alcohol injection.

Several (two or more) particular wave lengths of light separated in the spectrum, e.g., 4,000, 6,000 and 8,000 angstroms wave lengths, may be used. In addition, it is necessary to obtain or estimate the measure of unattenuated light intensity $I_0$. ($I_0$ is essentially constant for a given optical system and wave length.) In this manner, the attenuation due to liquid content is related by the equation $$\ln \frac{I_0}{I} = \epsilon l$$

where:

I=light intensity after attenuation;
$I_0$=incident light intensity;
$\epsilon$=extinction coefficient;
$l$=optical path length through the channel.

In the extinction coefficient, the parameters related to droplet size and droplet concentration needed for estimation of liquid content in the stream are:

$$\epsilon = k\pi r^2 n$$

where:

$k$=scattering area coefficient (Mie theory);
$r$=droplet radius;
$n$=droplet concentration.

This technique is quantitatively accurate only at very low concentrations of uniform sized droplets and becomes semiquantitative at higher droplet concentrations of various sizes. For the control equipment, however, only relative values of $I/I_0$, and hence changes in I, are needed since only changes in liquid content are important.

Another manner in which the light transmission control system may be useful is in warning and automatic shutdown or shifting to another supersonic expansion separator in the event of a malfunction within the flow channel. For example, if permeable wall 25 becomes so badly damaged that it is not passing liquid properly, the light beam will detect the increased liquid and at a preset liquid level a warning will be sounded and flow will be shunted to another separator while repairs are made in the damaged separator.

After evaluating the actual droplet sizes and concentrations for a particular flow stream, the proper wave lengths of light to be used for the desired accuracy of control are established. Two wave lengths are ample; however, they should be separated by several hundred angstroms on the spectrum. Although less accurate in control, a single, well-chosen wave length will generally be satisfactory.

Rectangular flow channel cross-sections were used with the embodiments of the invention described herein; however, walls of other shapes, such as square, triangular, etc., may be used.

The length of the straight intermediate section 20 (FIG. 1), together with the lengths of the bend and diffuser sections, are only limited by the ability to keep the flow supersonic. Whether or not a straight intermediate section should be used is dependent upon the type feed, the amount of condensed liquid in the stream and other operating parameters. While the diffuser section contour upstream of the throat is shown curved in the embodiments of the invention described herein, it is understood that the flow channel may be formed straight or otherwise to achieve an oblique shock system. The curved flow channel is designed for or corresponds to an idealized shock-free system.

Various modifications may be made in the preferred embodiments shown and described herein within the spirit and scope of the appended claims.

Other supersonic separator apparatus and techniques may be utilized with the concepts disclosed herein such as those illustrated and described in the following co-pending United States patent applications: Ser. No. 730,372, entitled, "Jet Pump and Supersonic Flow Separator," by Robert L. Garrett, filed May 20, 1968; Ser. No. 730,375, entitled, "Triangular Supersonic Flow Separator," by Robert L. Garrett and William J. McDonald, Jr., filed May 20, 1968; Ser. No. 730,373, entitled, "Supersonic Flow Separator with Film Flow Collector," by Robert L. Garrett, filed May 20, 1968; and Ser. No. 730,374, entitled, "Supersonic Flow Separator with Admixing," by Robert L. Garrett and William J. McDonald, Jr., filed May 20, 1968.

Having fully described the apparatus, method, objects and advantages of my invention, I claim:

1. A method for condensing and separating components from a multicomponent gas stream comprising:
   expanding said gas stream through a supersonic effuser to achieve low temperatures and low pressures in the supersonic gas stream and thereby form condensed particles;
   separating said particles from said gas stream;
   decelerating said gas stream to subsonic flow through a diffuser and recovering as pressure a portion of the energy of said gas stream; and
   adjusting the position of the final shock wave to locate the final shock wave near the diffuser throat for efficient operation at maximum back pressure.

2. A method as recited in claim 1 including adjusting the throat opening and contour of said diffuser to start supersonic flow of said gas stream.

3. A method as recited in claim 1 including withdrawing gas from said gas stream adjacent the throat of said diffuser to start supersonic flow of said gas stream.

4. A method as recited in claim 1 including controlling the final shock wave position to prevent movement thereof to an unstable position.

5. A method as recited in claim 1 including removing a boundary layer which forms on the flow channel walls.

6. A method as recited in claim 1 including creating a series of weak shock waves in the supersonic channel through which said gas stream flows to improve recovery of said particles.

7. A method as recited in claim 1 including passing said gas stream through a supersonic bend during separation of said particles from said gas stream and applying an electric field across said supersonic bend to obtain more rapid coalescence and prevent loss of liquid particles out of the end of said bend.

8. A method as recited in claim 1 including monitoring by light attenuation said gas stream for residual liquid content to control operational parameters.

9. A method as recited in claim 2 including withdrawing gas from said gas stream adjacent the throat of said diffuser to start supersonic flow of said gas stream.

10. A method as recited in claim 9 including controlling the final shock wave position to prevent movement thereof to an unstable position.

11. A method as recited in claim 10 including removing boundary layer which forms on the flow channel walls.

12. A method as recited in claim 11 including creating a series of weak shock waves in the supersonic channel through which said gas stream flows to improve recovery of said particles.

13. A method as recited in claim 12 including passing said gas stream through a supersonic bend during separation of said particles from said gas stream and applying an electric field across said supersonic bend to obtain more rapid coalescence and prevent loss of liquid particles out of the end of said bend.

14. A method as recited in claim 13 including monitoring by light attenuation said gas stream for residual liquid content to control operational parameters.

15. A method for condensing and separating components from a multicomponent gas stream comprising:
   expanding said gas stream through a supersonic effuser to achieve low temperatures and low pressures in the supersonic gas stream and thereby form condensed particles;
   allowing sufficient time for drops to grow to sufficient size for inertial separation;
   separating said particles from said gas stream;
   decelerating said gas stream to subsonic flow through a diffuser and recovering as pressure a portion of the energy of said gas stream; and adjusting the position of the final shock wave to locate said final shock wave near the diffuser throat for efficient operation at maximum back pressure.

16. Apparatus for condensing and separating components from a multicomponent gas stream comprising:
a supersonic effuser capable of expanding said gas stream to achieve low temperatures and low pressures in said supersonic gas stream and to form thereby condensed particles;
separation means through which said gas stream is adapted to be passed for separating said particles from said gas stream; and
a supersonic diffuser capable of decelerating said gas stream to subsonic flow to recover as pressure a portion of the energy of said gas stream including means to position the final shock wave such that subsonic velocity occurs with a minimum of static pressure losses across the final shock wave.

17. Apparatus as recited in claim 16 in which said means to position said final shock wave includes means adapted to adjust the throat area and contour of said diffuser.

18. Apparatus as recited in claim 17 in which said means to adjust the throat area and contour of said diffuser includes at least one movable diffuser wall member having a fixed configuration and pivotal at one end thereof.

19. Apparatus as recited in claim 17 in which said means to adjust the throat area and contour of said diffuser includes at least one flexible effuser wall member.

20. Apparatus as recited in claim 19 in which said flexible wall member is secured at one end and movable at the other end thereof and including a plurality of means movable inwardly toward and outwardly from said diffuser flow channel attached to said flexible wall member.

21. Apparatus as recited in claim 16 including means adapted to withdraw gas near the throat of said diffuser to start supersonic flow.

22. Apparatus as recited in claim 21 in which said means adapted to withdraw gas comprises a permeable wall area adjacent the throat of said diffuser and valve means adapted to open and close off flow of gas through said permeable area.

23. Apparatus as recited in claim 16 including means adapted to stabilize said shock wave comprising surge chambers containing low-pressure gas fluidly communicating with the throat of said diffuser.

24. Apparatus as recited in claim 16 in which said separation means includes a curved flow channel having an outer curved permeable wall and an inner curved wall, said inner curved wall being provided with means including openings adapted to remove stagnant gas layers to prevent unwanted shock waves and reduce friction.

25. Apparatus as recited in claim 16 in which said separation means includes a curved flow channel having an outer curved permeable wall and an inner curved wall, said inner curved wall being provided with means adapted to create a series of beneficial weak shock waves in said gas stream.

26. Apparatus as recited in claim 16 in which said separation means includes a curved flow channel; and including means adapted to apply an electrostatic field across said curved flow channel to enhance coagulation of said particles.

27. Apparatus as recited in claim 16 including means adapted to monitor said gas stream for residual liquid content to control operating parameters of said apparatus.

28. Apparatus as recited in claim 16 in which said separation means includes a curved flow channel having an outer curved wall and an inner curved wall, said inner curved wall providing a smooth large area surface for flow, a portion of said inner wall being frangible at a selected pressure level.

29. Apparatus as recited in claim 16 in which said separation means includes a curved channel having an outer curved wall and an inner curved wall, said outer curved wall comprising:
a relatively thin permeable wall member; and
a continuous more permeable supporting plate backing said permeable wall member.

30. Apparatus as recited in claim 28 in which said outer curved wall comprises:
a relatively thin permeable wall member; and
a continuous more permeable supporting plate backing said permeable wall member.

31. Apparatus as recited in claim 21 including means adapted to stabilize said shock wave comprising surge chambers containing low-pressure gas fluidly communicating with the throat of said diffuser.

32. Apparatus as recited in claim 31 in which said separation means includes a curved flow channel having an outer curved permeable wall and an inner curved wall, said inner curved wall being provided with means including openings adapted to remove stagnant gas layers to prevent unwanted shock waves and reduce friction.

33. Apparatus as recited in claim 32 including means provided on said inner curved wall adapted to create a series of beneficial weak shock waves in said gas stream.

34. Apparatus as recited in claim 33 including means adapted to apply an electronstatic field across said curved flow channel to enhance coagulation of said particles.

35. Apparatus as recited in claim 34 including means adapted to monitor said gas stream for residual liquid content to control operating parameters of said apparatus.

36. Apparatus as recited in claim 35 in which said inner curved wall provides a smooth area surface for flow; a portion of said inner wall being frangible at a selected pressure level; and said outer curved wall comprising a relatively thin permeable wall member and a continuous more permeable supporting plate backing said permeable wall member.

37. Apparatus for condensing and separating components from a multicomponent gas stream comprising:
a supersonic effuser capable of expanding said gas stream to achieve low temperatures and low pressures in said supersonic gas stream and to form thereby condensed particles;
separation means through which said gas stream is adapted to be passed for separating said particles from said gas stream;
a supersonic diffuser capable of decelerating said gas stream to subsonic flow to remove as pressure a portion of the energy of said gas stream; and
means adapted to withdraw gas near the throat of said diffuser to start supersonic flow.

38. Apparatus as recited in claim 37 in which said means adapted to withdraw gas comprises a permeable wall area adjacent the throat of said diffuser and valve means adapted to open and close off flow of gas through said permeable area.

39. Apparatus as recited in claim 37 including means adapted to stabilize said shock wave comprising surge chambers containing low-pressure gas fluidly communicating with the throat of said diffuser.

40. Apparatus as recited in claim 37 in which said separation means includes a curved flow channel having an outer curved permeable wall and an inner curved wall, said inner curved wall being provided with means including openings adapted to remove stagnant gas layers to prevent unwanted shock waves and reduce friction.

41. Apparatus as recited in claim 37 in which said separation means includes a curved flow channel having an outer curved permeable wall and an inner curved wall, said inner curved wall being provided with means adapted to create a series of beneficial weak shock waves in said gas stream.

42. Apparatus as recited in claim 37 in which said separation means includes a curved flow channel; and including means adapted to apply an electrostatic field across said curved flow channel to enhance coagulation of said particles.

43. Apparatus as recited in claim 37 including means adapted to monitor said gas stream for residual liquid content to control operating parameters of said apparatus.

44. Apparatus for condensing and separating components from a multicomponent gas stream comprising:
   a supersonic effuser capable of expanding said gas stream to achieve low temperatures and low pressures in said supersonic gas stream and to form thereby condensed particles;
   separation means through which said gas stream is adapted to be passed for separating said particles from said gas stream;
   a supersonic diffuser capable of decelerating said gas stream to subsonic flow to recover as pressure a portion of the energy of said gas stream; and
   means adapted to stabilize said shock wave comprising surge chambers containing low-pressure gas fluidly communicating with the throat of said diffuser.

45. Apparatus as recited in claim 44 in which said separation means includes a curved flow channel having an outer curved permeable wall and an inner curved wall, said inner curved wall being provided with means including openings adapted to remove stagnant gas layers to prevent unwanted shock waves and reduce friction.

46. Apparatus as recited in claim 44 in which said separation means includes a curved flow channel having an outer curved permeable wall and an inner curved wall, said inner curved wall being provided with means adapted to create a series of beneficial weak shock waves in said gas stream.

47. Apparatus as recited in claim 44 in which said separation means includes a curved flow channel; and including means adapted to apply an electrostatic field across said curved flow channel to enhance coagulation of said particles.

48. Apparatus as recited in claim 44 including means adapted to monitor said gas stream for residual liquid content to control operating parameters of said apparatus.

49. Apparatus for condensing and separating components from a multicomponent gas stream comprising:
   a supersonic effuser capable of expanding said gas stream to achieve low temperatures and low pressures in said supersonic gas stream and to form thereby condensed particles;
   channel means leading from said effuser to allow sufficient time for drops to grow to sufficient size for inertial separation;
   separation means through which said gas stream is adapted to be passed for separating said particles from said gas stream; and
   a supersonic diffuser capable of decelerating said gas stream to subsonic flow to recover as pressure a portion of the energy of said gas stream including means to position the final shock wave such that subsonic velocity occurs with a minimum of static pressure losses across the final shock wave.

References Cited

UNITED STATES PATENTS

| 1,519,428 | 12/1924 | Wilisch | 55—461 |
| 2,560,634 | 7/1951 | Colley | 73—147 |
| 2,570,129 | 10/1951 | Johnson | 73—147 |
| 2,729,974 | 1/1956 | Lee et al. | 73—147 |
| 3,045,705 | 7/1962 | Hausammann | 73—147 |
| 3,104,680 | 9/1963 | Orlin | 73—147 |
| 3,241,490 | 3/1966 | Ricateau et al. | 73—147 |
| 3,255,571 | 6/1966 | Walker et al. | 55—9 |
| 3,258,897 | 7/1966 | Mayer et al. | 55—137 |
| 3,399,972 | 9/1968 | Skeggs et al. | 23—253 |

FOREIGN PATENTS

| 619,722 | 3/1949 | Great Britain | 230—128 |
| 930,151 | 7/1963 | Great Britain | 55—1 |

OTHER REFERENCES

Cornvich et al.: Handbook of Supersonic Aerodynamics, section 17, NAVWEPS report 1488 (volume 6), January 1964, pages 237–240 and 273–275.

Liepmann, H. et al.: Elements of Gasdynamics, John Wiley & Sons, New York, 1957, pages 124–133.

REUBEN FRIEDMAN, Primary Examiner

C. N. HART, Assistant Examiner

U.S. Cl. X.R.

55—15, 127, 277, 431; 23—232, 253; 62—11; 73—147